United States Patent [19]
Pichonsky

[11] 3,767,343
[45] Oct. 23, 1973

[54] PYROHY MAKER
[76] Inventor: Harry Pichonsky, Box 221, Thorsby, Alberta, Canada
[22] Filed: Dec. 2, 1971
[21] Appl. No.: 203,981

[52] U.S. Cl.................. 425/218, 425/276, 425/278, 425/281, 425/292, 425/318, 30/232, 30/291
[51] Int. Cl............................................. B29c 3/00
[58] Field of Search.................... 425/218, 276, 278, 425/281, 318, 292, 83, 30; 84/402; 46/189, 191; 30/298, 232, 290, 291

[56] References Cited
UNITED STATES PATENTS

| | | | |
|---|---|---|---|
| 1,199,880 | 10/1916 | Erchelberger et al. | 425/278 |
| 1,584,757 | 5/1926 | Dow | 425/318 X |
| 1,252,803 | 1/1918 | Holliday | 30/232 |
| 3,374,541 | 3/1968 | Earnest et al. | 30/232 |

Primary Examiner—Robert L. Spicer, Jr.
Attorney—Stanley G. Ade

[57] ABSTRACT

A pair of plastic concavo-convex halves are hinged together on one edge with the perimeters engaging one another when closed to form cutting edges for trimming the dough. A T-shaped stem extends from one half and is engaged between the second and third fingers thus anchoring the device in the hand and enabling the entire forming operation to be accomplished with one hand.

1 Claim, 4 Drawing Figures

PATENTED OCT 23 1973 3,767,343
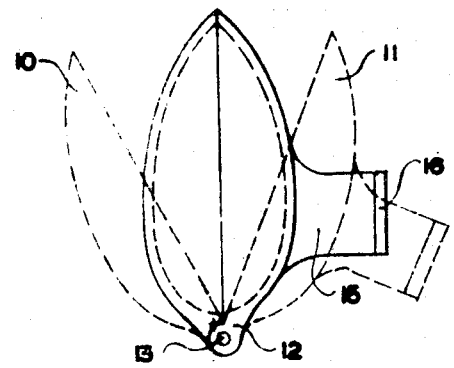
FIG. 3
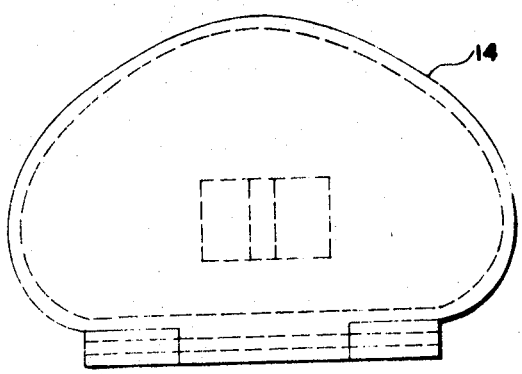
FIG. 2
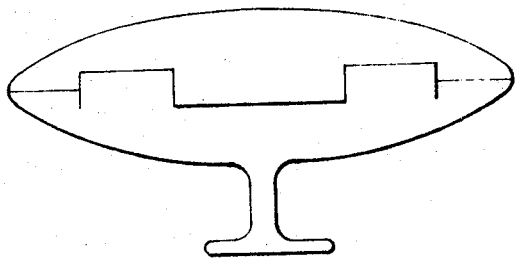
FIG. 1
FIG. 4
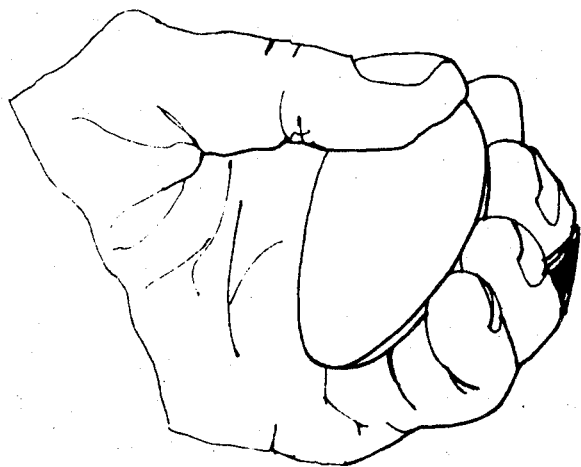
INVENTOR.
HARRY PICHONSKY
BY
Stanley L. Ade 3,767,343

PYROHY MAKER

BACKGROUND OF THE INVENTION

This invention relates to new and useful improvements in moulds for forming pyrohy or the like.

The conventional method is to make pyrohy by hand under which circumstances the dough is rolled out fairly thin and round pieces of dough are cut with a cookie cutter or the like. The cut piece of dough is placed in the palm of one hand and the filling is placed in the center of the piece of dough. The dough is folded over and with the thumb and index finger of the opposite hand, the edges of the dough are squeezed until the dough is firmly sealed and shaped to form the pyreeh. It is therefore very difficult to form a consistently shaped pyreeh or the like by this method.

SUMMARY OF THE INVENTION

The present invention overcomes these disadvantages by providing a mould which can be operated by one hand. The mould is hinged together and a stem extends from one half which passes between the fingers of the one hand and a cross piece anchors the mould to the fingers. The dough is merely placed within the mould, the filling placed therein and the mould closed by the one hand which seals and trims the dough in one operation thus providing pyrohy which are consistent in size and shape as well as providing a device which manufactures said pyrohy more rapidly and easily.

The principal object and essence of the invention is therefore to provide a device of the character herewithin described which enables pyrohy to be made and formed with one hand.

Another object of the invention is to provide a device of the character herewithin described in which the mould is easily anchored between two fingers of the hand being used to operate same.

Another object of the invention is to provide a device of the character herewithin described which enables pyrohy or the like to be manufactured on a consistent basis insofar as shape and size is concerned.

A yet further object of the invention is to provide a device of the character herewithin described which is simple in construction, economical in manufacture, and otherwise well suited for the purpose for which it is designed.

With the foregoing in view, and such other or further purposes, advantages or novel features as may become apparent from consideration of this disclosure and specification, the present invention consists of, and is hereby claimed to reside in, the inventive concept which is comprised, embodied, embraced or included in the methodk process, construction, composition, arrangement or combination of parts, or new use of any of the foregoing, of which concept, one or more specific embodiments of same are herein exemplified as illustrative only of such concept, reference being had to the accompanying figures in which:

DESCRIPTION OF THE DRAWINGS

FIG. 1 is a rear elevation of the device.

FIG. 2 is a top plan view of FIG. 1.

FIG. 3 is an end view of FIG. 1.

FIG. 4 is an isometric view showing the device in the hand of the user.

In the drawings like characters of reference indicate corresponding parts in the different figures.

DETAILED DESCRIPTION

Proceeding therefore to describe the invention in detail, reference should be made to the accompanying drawings in which 10 illustrates one half of a mould and 11 the other half, said halves being hinged together by means of hinge 12 and hinge pin 13 as clearly shown.

Each half is manufactured from plastic and is concavo-convex thus forming two substantially symmetrical shells, The configuration of the perimeter 14 is curved to conform with conventional pyreeh shape although, of course, this shape can vary if desired.

The perimetrical edges 14 of the two halves meet in mating relationship when the halves are closed thus forming sealing and cutting edges as will hereinafter be described.

A stem 15 extends outwardly from the half 11 of the mould and a cross piece 16 is formed on the end of the stem.

This enables the stem to extend between the second and third fingers of the hand in which the mould is placed with the cross piece engaging the backs of the fingers thus anchoring the mould in position within the hand as shown in FIG. 4.

In operation, the dough is rolled out fairly thinly as is conventional and round pieces of dough are cut with a cookie cutter or the like.

A round piece of dough is placed upon the open mould held within the palm of one hand and the necessary filling is then placed upon one half of the dough. The fingers of the hand are then closed thus closing up the mould. At this point the edges 14 squeeze the two halves of the dough together and seal same and further pressure cuts off the excess dough outside of the mould. Upon opening the mould, the finished pyreeh is ready for cooking in the usual way.

The use of this device not only provides consistently sized and shaped pyrohy but also enables the pyrohy to be made more rapidly and easily than heretofor.

The stem is an important item and enables the mould to be held and operated by one hand.

Various modifications can be made within the scope of the inventive concept which is herein disclosed and/or claimed.

What I claim as my invention is:

1. A mould for forming pyrohy comprising in combination a pair of symmetrical mould halves, each consisting of a concavo-convex shell having a longitudinally extending edge and an arcuately curved edge extending around the mould halves from one end of the longitudinally extending edge to the other, hinge means securing said halves together along the longitudinal edges thereof, the perimetrical edges of the halves forming cutting and sealing edges when closed to sever excess dough from the dough within, and means to detachably anchor said mould by one half thereof within the palm of the hand for forming pyrohy, said means comprising a stem secured to and extending outwardly from the outer surface of said one half engagable between the fingers of the hand, and a cross piece upon the distal end of the stem extending upon each side thereof and engagable by the back of the fingers between which said stem extends.

* * * * *